United States Patent
Oliver

(10) Patent No.: US 9,003,545 B1
(45) Date of Patent: Apr. 7, 2015

(54) SYSTEMS AND METHODS TO PROTECT AGAINST THE RELEASE OF INFORMATION

(75) Inventor: Ian Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/524,107

(22) Filed: Jun. 15, 2012

(51) Int. Cl.
- *G06F 7/04* (2006.01)
- *G06F 17/30* (2006.01)
- *H04N 7/16* (2011.01)
- *H04L 9/08* (2006.01)

(52) U.S. Cl.
CPC ..................................... *H04L 9/088* (2013.01)

(58) Field of Classification Search
USPC ......................................................... 726/26
See application file for complete search history.

(56) References Cited

U.S. PATENT DOCUMENTS

| | | | |
|---|---|---|---|
| 2005/0141693 A1* | 6/2005 | Stuart et al. | 379/265.06 |
| 2010/0313267 A1* | 12/2010 | Goldfarb et al. | 726/23 |
| 2012/0240185 A1* | 9/2012 | Kapoor et al. | 726/1 |
| 2012/0304130 A1* | 11/2012 | Rueff et al. | 715/850 |
| 2013/0109362 A1* | 5/2013 | Simms | 455/414.1 |
| 2013/0132079 A1* | 5/2013 | Sehgal et al. | 704/235 |

* cited by examiner

*Primary Examiner* — Kambiz Zand
*Assistant Examiner* — Stephen Sanders
(74) *Attorney, Agent, or Firm* — Holland & Hart, LLP

(57) ABSTRACT

A computer-implemented method to protect against the release of information is described. The processor monitors for a communication with an unverified number. Upon detection of the communication with an unverified number, the processor monitors the communication for a protected string. Upon detection of a protected string, the processor performs an intervention action.

18 Claims, 9 Drawing Sheets

SYSTEMS AND METHODS TO PROTECT AGAINST THE RELEASE OF INFORMATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is desirable to anyone who uses and relies on computers.

The user of personal information has become increasingly important in connected with computing technologies. For example, information may be used to identify a user. In another example, information may be used to gain access to an electronic account (e.g., a credit card account and/or bank account). As an example, a username and password may be provided to gain access to an account. Because of the sensitive nature of this information, it may be desirable to protect this type of information. For instance, it may be desirable to protect this information from others that desire to steal the user's identity, gain access to the user's accounts, etc.

SUMMARY

A computer-implemented method to protect against the release of information is described. The processor monitors for a communication with an unverified number. Upon detection of the communication with the unverified number, the processor monitors the communication for a protected string. Upon detection of the protected string, the processor performs an intervention action.

The processor may determine at least one characteristic about the unverified number. In one embodiment, monitoring the communication for a protected string includes monitoring the audible information of the communication for a verbal release of the protected string.

Monitoring the audible information may include obtaining a digital version of the audible information, correlating the digital version with the protected string, and/or determining that the correlation satisfies a threshold. The protected string may be a sequence of numbers having at least two numbers. The protected string may also be a sequence of letters having at least two letters. The protected string may further be a sequence of characters having a combination of letters and numbers.

In some cases, reputation information may be obtained about the unverified number. Reputation information may be provided about the unverified number.

A computing device configured to protect against the release of information is also described. The computing device includes a processor, memory in electronic communication with the processor, and instructions stored in the memory. The instructions being executable by the processor to monitor for a communication with an unverified number. Upon detection of a communication with the unverified number, the instructions are further executable to monitor the communication for a protected string. Upon detection of the protected string, the instructions are further executable to perform an intervention action.

A computer-program product to protect against the release of information is additionally described. The computer-program product includes a non-transitory computer-readable storage medium that stores computer executable instructions. The instructions being executable by a processor to monitor for a communication with an unverified number. Upon detection of the communication with the unverified number, the instructions are further executable by the processor to monitor the communication for a protected string. Upon detection of the protected string, the instructions are further executable by the processor to perform an intervention action.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
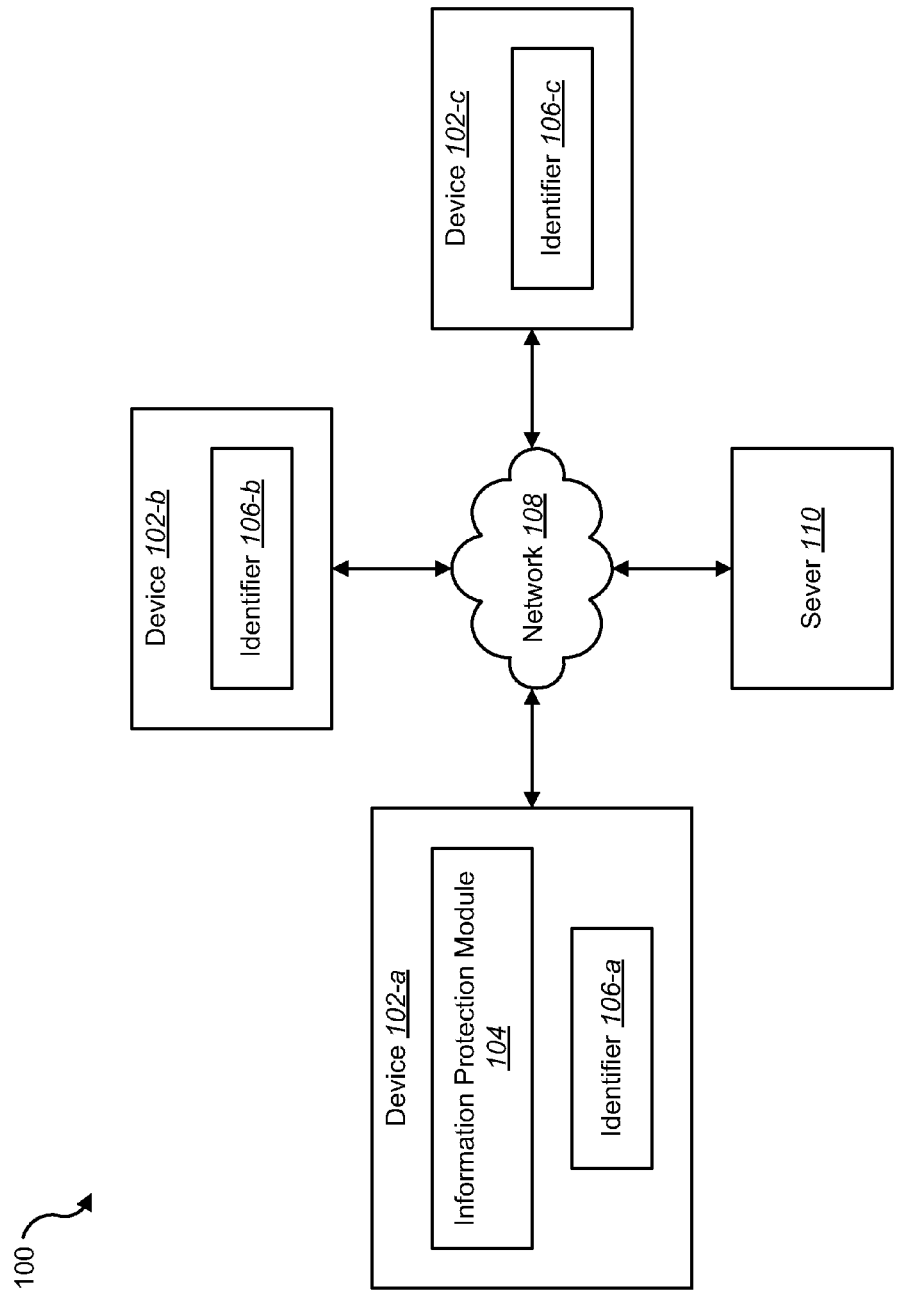
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Users are routinely solicited to provide sensitive information. For example, telephone scammers attempt to scam users into verbally disclosing sensitive information (e.g., credit card information, bank account information, usernames, passwords, social security numbers, and other personal information, etc.). In some cases, users are lured into providing sensitive information under the guise of verifying their identity and/or information.

In some configurations, the systems and methods described herein may provide an informational alert when sensitive information is being verbally released to an unknown recipient. For example, an informational alert may be provided when sensitive information is being released during a phone call with an unknown number.

In some configurations, formats of sensitive information may be stored for reference and/or comparison. In one embodiment, at least partial versions of sensitive information may be stored in an audio format (pre-recorded by the user, for example). In other configurations, at least partial versions of sensitive information may be stored in a digital format. For example, the partial versions of the sensitive information may be stored on the device and/or on a server. In one embodiment, the device may include a partial portion of the information and a backend server may include the remaining information for a full match. Additionally or alternatively, the device may store the entire information.

In one example, a call (incoming or outgoing, for example) may be detected. A determination may be made as to whether the call is associated with a known number or an unknown number. In some cases, the systems and methods described herein may operate differently based on specific characteristics of a number and/or call. In some configurations, the audio communication may be monitored for the audible entry of numbers, letters, partial, and/or full personal information. In some cases, a determination is made as to whether the audio information matches the numbers, letters, partial, and/or full personal information contained in storage. In one example, the audio information may be compared to a predefined format (e.g., credit card number, address, social security number, tax file number, account formats of major banks). If a match (e.g., correlation satisfying a threshold) occurs between a portion of the audio information and a portion of the stored sensitive information, then an alert for a possible release of sensitive information may be triggered. In some cases, the correlation between the audio information and the sensitive information may be used to identify the possible type (e.g., bank account number, social security number, etc.) of personal identification leakage.

In some configurations, the phone number information may be automatically (or on request, for example) looked up. If the number is detected for a first time and/or is unknown, then the device may do the lookup in advance so that as soon the sensitive information is detected as being released, the information may be presented to the user. In some cases, the microphone may be muted and the information may be shown to the user so that the user has a chance to review the information and make a decision before completely providing all of the sensitive information.

In some configurations, characteristics about the number and/or call may be determined. In some cases, these characteristics may be used to warn the user before the user completes the disclosing of sensitive information. Examples of characteristics include, the owner of the number (is it a business number or a personal number, for example), how long the number has been registered, if the number is a VOIP number, if the number is linked to a Skype username, if the number is a local number and/or an international number, the reputation of the number, how many people call the number, previous reports concerning the number, etc. In some embodiments, the device may report back the users impressions about the call to protect subsequent users (e.g., to generate reputation information).

FIG. 1 is a block diagram illustrating one embodiment of an environment 100 in which the present systems and methods may be implemented. In one example, a device 102 may communicate with one or more other devices 102 through a network 108. For example, a first device 102-a may communicate with a second device 102-b and/or a third device 102-c through one or more networks 108. In some embodiments, this communication between devices may be a call (e.g., audio call, audio and video call, voice message, conference call, etc.). For example, the call may facilitate audio communication between two or more devices 102. Examples of devices 102 include cellular phones, personal communicators, tablets, telephones, videophones, VOIP devices (e.g., terminals), communication devices, Private Branch Exchange (PBX) devices, Session Initiation Protocol (SIP) devices, etc. In one example, the device 102-a may be an electronic device that monitors audio communications for multiple communication devices (a gateway for an enterprise voice system, for example).

The network 108 may facilitate communication between devices 102 and/or between a device 102 and a server 110. In some configurations, the network 108 may represent multiple networks 108 coupled together to enable communication across the networks 108. Examples of the network 108 include public switched telephone networks (PSTN), internet protocol (IP) networks, proprietary networks, etc. For instance, the network 108 may include telephone lines, fiber optic cables, cellular networks, wireless networks, satellite networks, undersea telephone cables, and the like. In some configurations, the network 108 may use one or more services for transmitting and receiving audio information through the network 108. Examples of services include the plain old telephone service (POTS), internet telephony, voice over internet protocol (VOIP), proprietary services (e.g., Skype), etc. In some cases, the network 108 may be public, private, or a combination of the two.

In one embodiment, each device 102 may be associated with an identifier 106. For example, the first device 102-a may include a first identifier 106a, the second device 102-b may include a second identifier 106-b, and the third device 102-c may include a third identifier 106-c. Examples of identifiers include phone numbers, IP addresses, email addresses, machine address code (MAC) addresses, VOIP numbers, usernames (e.g., Skype name), etc. For instance, the first device 102-a may be associated with a POTS phone number (e.g., first identifier 106-a) and the second device 102-b may be associated with a VOIP phone number (e.g., second identifier 106-b). Throughout the discussion below, the identifier 106 may be a number. However, it is understood, that any sort of data or information may used as the identifier 106.

In various situations, sensitive information may be sought and/or provided during an audio communication (e.g., a call) between two or more devices 102. For example, a thief may call a user (call the user's device via the device's number, for example) to lure the user into providing sensitive information during the call. In another example, a thief may send a Short Message Service (SMS) message to a user to lure the user into calling a number (the number of the thief's device, for example) and provide sensitive information during the call. For instance, a thief may seek sensitive information (e.g., credit card information, bank account information, social security numbers, usernames, passwords, etc.) to steal from the user (e.g., identify theft, financial theft, etc.). Thus, it may be beneficial to protect against the release of sensitive information.

In one embodiment, one or more of the device 102 may include an information protection module 104. For example, the first device 102-a may include the information protection module 104. In some configurations, the information protection module 104 may protect a user from releasing sensitive information during a communication (e.g., a call). For example, the information protection module 104 may protect the user that is communicating via the first device 102-a from releasing sensitive information during a call with another device (the second device 102-b, for example). In some configurations, the information protection module 104 may communicate with the server 110 to facilitate the protection of sensitive information. The information protection module 104 will be discussed in further detail below.

Figure 2:
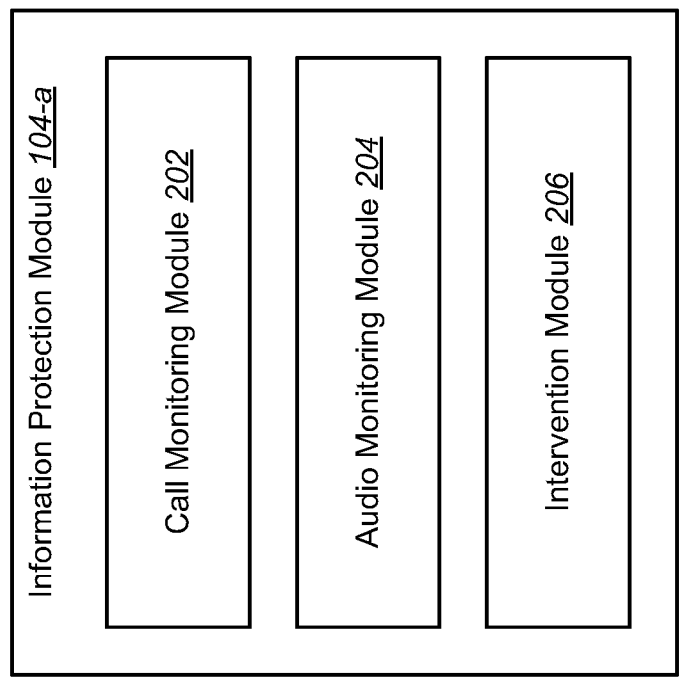
FIG. 2 is a block diagram illustrating one embodiment of an information protection module.

FIG. 2 is a block diagram illustrating one embodiment of an information protection module 104-a. The information protection module 104-a may be one example of the information protection module 104 illustrated in FIG. 1. In some configurations, the information protection module 104-a may include a call monitoring module 202, an audio monitoring module 204, and an intervention module 206.

In one embodiment, the call monitoring module 202 may monitor information about a call. For example the call monitoring module 202 may determine if a number is trusted. In some cases, the call monitoring module 202 may also determine the type of number, the type of call, and/or the reputation of the number. In some configurations, the call monitoring module 202-a may provide reporting information and/or feedback about the number and/or the call.

In one embodiment, the audio monitoring module 204 may monitor the audio content of the call. For example, the audio monitoring module 204 may monitor the audio content of a call to protect against the leakage of personal information. For instance, the audio monitoring module 204 may monitor audio content for a particular string and/or a particular format of a string (e.g., string of numbers and/or letters). In some configurations, the audio monitoring module 204 may detect a phishing scheme based on the audio content received from the other device (based on the semantic properties of the received audio, for example).

In one embodiment, the intervention module 206 may perform an intervention to protect a user from releasing sensitive information. For example, the intervention module 206 may warn a user against providing sensitive information during a suspect call (e.g., a call that is flagged based on the call monitoring module 202).

Figure 3:
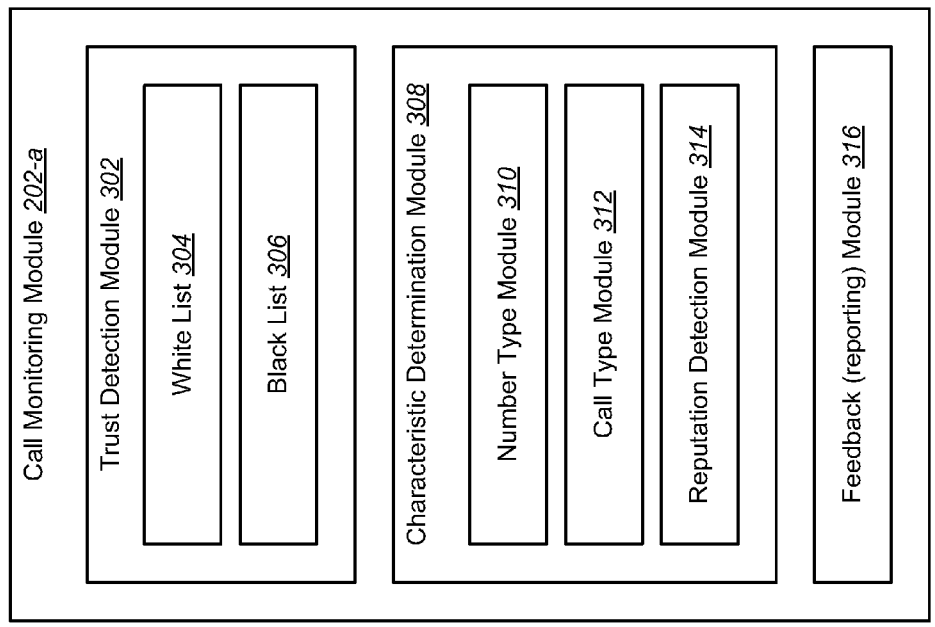
FIG. 3 is a block diagram illustrating one embodiment of a call monitoring module.

FIG. 3 is a block diagram illustrating one embodiment of a call monitoring module 202-a. The call monitoring module 202-a may be one example of the call monitoring module 202 illustrated in FIG. 2. In some configurations, the call monitoring module 202-a may include a trust detection module 302, a characteristic determination module 308, and a feedback module 316.

In one embodiment, the trust detection module 302 may determine if each number participating in a call is known to be trusted or known to be untrusted. In some cases, the information protection module 104 may determine whether the audio portion of a call should be monitored based on the detected trust of a number. For example, the audio may not need to be monitored if the call is with a number that is known to be trusted (e.g., on a white list 304). In another example, the audio may need to be monitored if the call is with a number that is known to be untrusted (e.g., on a black list 306). In the case of a number that is known to be untrusted, the information protection module 104 may perform an intervention with the user because it is already known to be untrusted. In some cases, the information protection module 104 may only monitor the audio of a call when a number is not known to be trusted or known to be untrusted. In some embodiments, not monitoring the audio portion of a call may preserve resources (e.g., battery power, etc.).

In some configurations, the trust detection module 302 may include a white list 304. The white list 304 may be a list of numbers that are known to be trusted. For example, the white list 304 may include the numbers from a user's address book (e.g., a user inputted contact list of known numbers), recent call list, etc. In some cases, the white list 304 may include numbers from a database of trusted numbers. For example, the database of trusted numbers may be a global address list (e.g., corporate directory) and/or a database of trusted numbers (located on the server 110, for example). In some cases, a user may contribute to the generation of the database of trusted numbers by reporting to the database that a number is trusted. In one example, a number that a user has had more than two calls with may be considered a trusted number.

In some configurations, the trust detection module 302 may also include a black list 306. The black list 306 may be a list of numbers that are known to be untrusted. For example, the black list 306 may include numbers that have been selected as untrusted by the user. In another example, the black list 306 may include numbers from a database of untrusted numbers (located on the server 110, for example). For instance, the user may report to the database that a number is untrusted. This may add the untrusted number to the black list 306. This may also add the untrusted number to the database of untrusted numbers so that the untrusted number may be propagated to other black lists on other devices 102.

In one embodiment, the characteristic determination module 308 may determine characteristics about a number and about a call. For example, the characteristic determination module 308 may determine factors that may help a user determine if the call should be trusted. For example, if a caller says that the call is from the local energy company, but the user is notified that the caller is calling long distance with a number that is registered to an individual, then the caller may not be legitimate. In another example, if a SMS message indicates that a credit card has been compromised, but the user is notified that the number to call is a VOIP number registered to an international user overseas, then the number may not be legitimate. In some cases, the user may be notified to be on alert that the caller may not be legitimate. In some configurations, the characteristic determination module 308 may include a number type module 310, a call type module 312, and a reputation detection module 314.

In one embodiment, the number type module 310 may determine information about each number being used. For example, the number type may be a business number (e.g., registered to a business), a personal number (e.g., registered to an individual or residence), a VOIP number (e.g., associated with a VOIP provider), etc. In some cases, the number type module 310 may determine the owner of a number (using caller identification (ID), for example), how long the number has been registered, and/or the location where a number is communicating from, etc.

In some cases, the number type module 310 may determine information about a number. For example, the number type module 310 may look up information about the number from one or more databases. In one example, the number type module 310 may determine a reputation associated with the number based at least in part on a reputation information database. For instance, the reputation information database may be a database that includes feedback from multiple users that indicates the perceived reputation for a given number. In some cases, the number type module 310 may determine other information about the number. For example, whether the number is associated with complaints or bad reviews.

In one embodiment, the call type module 312 may determine information about the call. For example, the call type module 312 may determine if a call is a local call, a long distance call, an international call, a VOIP call, etc. In some cases, the call type module 312 may also determine the duration of a call, the quality of the call, etc.

In one embodiment, the reputation detection module 314 may determine the reputation associated with a number based on a database (located on a server 110, for example). For example, feedback from users and/or other sources (e.g., better business bureau ratings, etc.) may be used to allocate reputation scores to a database of numbers. In some cases, the reputation detection module 314 may access a reputation database and determine if the reputation score satisfies one or more predetermined thresholds. For example, if the reputation detection module 314 determines that the reputation score of a particular number satisfies a good reputation threshold, then the number may be considered to have a good reputation. If the reputation detection module 314 determines that the reputation score of a particular number does not satisfy the good reputation threshold (e.g., satisfies a bad threshold), then the number may be considered to have a bad reputation. If the reputation score of a number is between the good threshold and the bad threshold, then the number may be considered to have a questionable reputation. In some cases, the reputation thresholds may be adjusted by the user so that a user may customize the impact of the number's reputation score.

In one embodiment, the feedback module 316 may allow a user to provide feedback about a number/call. For example, a user may not realize the illegitimacy of a call until after the call has ended. In some cases the feedback module 316 may allow the user to provide feedback about the call/number. In some cases, the feedback from a user may be used to update the reputation of a number. In some cases the feedback from a user may also be used to generate a white list 304 and/or a black list 306.

In some configurations, the call monitoring module 202-a may determine information about the number and/or call as soon as the call is started so that the audio monitoring module 204 may not have to wait for lookup information to be performed when a potential release of information is detected.

Figure 4:
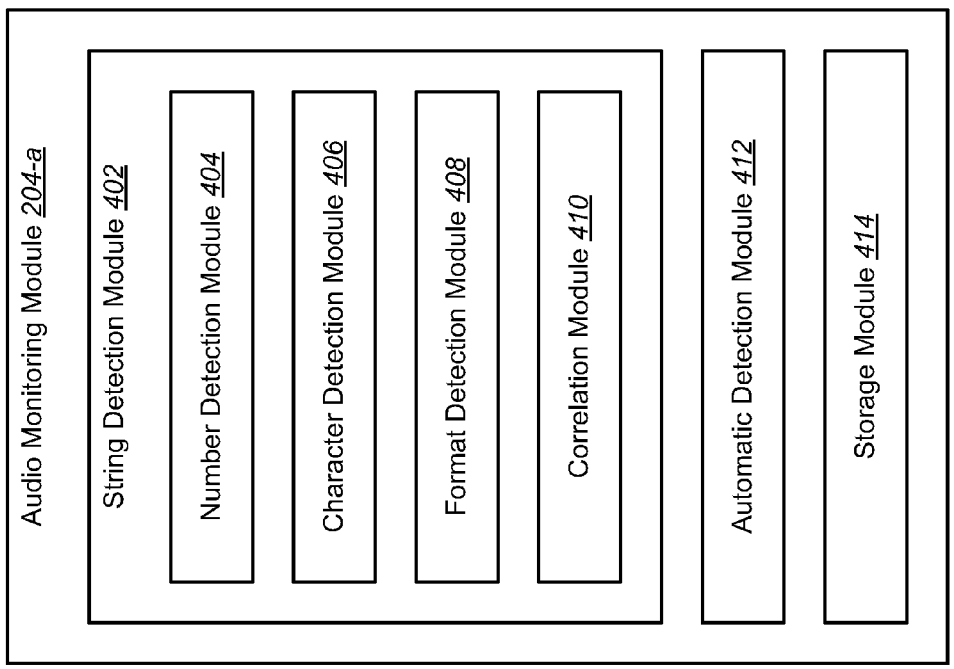
FIG. 4 is a block diagram illustrating one example of an audio monitoring module.

FIG. 4 is a block diagram illustrating one example of an audio monitoring module 204-a. The audio monitoring module 204-a may be one example of the audio monitoring module 204 illustrated in FIG. 2. In some configurations, the audio monitoring module may include a string detection module 402, an automatic detection module 412, and a storage module 414.

In one embodiment, the string detection module 402 may detect strings that are spoken by a user. For example, the string detection module 402 may detect that a series of digits (corresponding to the first few digits of a credit card number, for example) is being communicated as part of the audio communication. In one example, the series of digits may be spoken by the user. In another example the series of digits may be a series of audibly encoded tones (from a touch tone phone, for example). In some configurations, the string detection module 402 may use speech recognition techniques to translate audible information into digital information so the audible content may be monitored. In some configurations, the string detection module 402 may include a number detection module 404, a character detection module 406, a format detection module 408, and a correlation module 410.

In one embodiment, the number detection module 404 may detect a number in an audible communication. For example, the number detection module 404 may detect that a user is saying a number. For instance, the number detection module 404 may detect a "4" when a user says "four," may detect a "5" and a "6" when a user says "fifty six," and so forth.

In one embodiment, the character detection module 406 may detect a character in an audible communication. For example, the character detection module 406 may detect that a user is saying a character or word. For instance, the number detection module may detect the a "v" when a user says "v," may detect a "!" when the user says "exclamation point," may detect each character "p" "a" "s" "s" when a user says "pass," and so forth.

In some configurations, the string detection module 402 may trigger when a particular string, a particular format, or a portion of a particular string is spoken. In one embodiment, the format detection module 408 may detect if a particular string format is spoken. In one example, a particular format may be four subsequent numbers (to protect against the release of a credit card number, for example). In this example, if the number detection module 404 detects four subsequent numbers, then the format detection module 408 may detect that the particular format has been satisfied and the string detection module 402 may be triggered. In another example, a particular format may be two letters followed by a "_" followed by a number (corresponding to a username sequence, for example). In this example, if the string detection module 402 detects the sequence "a" "b" "_" "1" (via the character detection module 406 and the number detection module 404), then the format detection module 408 may detect that the particular format has been satisfied and the string detection module 402 may be triggered.

In some embodiments, particular strings to be monitored may be stored (in storage module 414, for example). For example, one particular string may be a username and another particular string may be a password. In some cases, sensitive information such as passwords may be encrypted or stored as a salted hash so that the sensitive information is not stored in plain text. In one embodiment, particular strings may be stored in the storage module 414 on the device. In another embodiment, particular strings may be stored on a server (e.g., server 110). For instance, usernames and/or passwords may be compared with a username and password stored on a central server. In one embodiment, the correlation module 410 may correlate a particular string with number and character information from the number detection module 404 and the character detection module 406 to determine if a detected string matches a particular string. In some cases, if the correlation module 410 detects a partial correlation that satisfies a threshold, then the correlation module 410 may detect a correlation and the string detection module 402 may be triggered. For example, the correlation detection module 410 may trigger based on a correlation before the entire particular string has been said by the user. In some cases, this may allow an intervention to alert a user before sensitive information is completely disclosed.

In some cases, the triggering of the audio monitoring module 204 may be based on the particular number. For example, if the call monitoring module 202 determines that both numbers on the call belong to the same entity, then some information may be released without intervention while other information may not be released without intervention or may not be released at all. For instance, in this example, a username may be allowed to be released without any intervention to the number (because it is known to belong to the same entity) while the password (that follows the format "a" "b" "_" "1", for example) may not be allowed to be released at all (e.g., under no circumstances). It is noted that the user or an administrator may determine the policies regarding release of specific information.

In one embodiment, an automatic detection module 412 may perform similar text recognition and detection on the audible content sent from another device 102. In some cases, phishing attempts and luring language correspond with determinable semantic patterns. For example, a thief posing as a bank, may state the bank's name several time throughout the conversation to lure the user into thinking that they are talking with the bank. In some cases, the automatic detection module 412 may use text recognition and language analysis, semantic pattern analysis, and social engineering techniques to detect illegitimate calls and phishing attempts based on the audible content of the other user (e.g., the thief).

Figure 5:
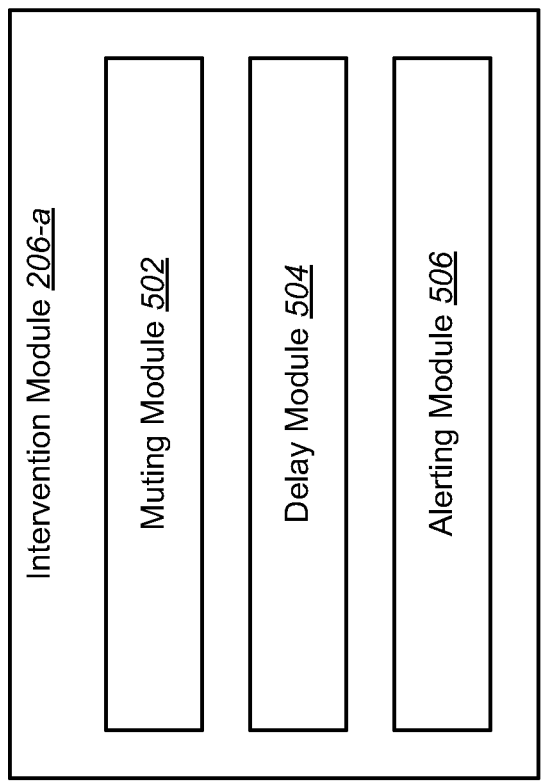
FIG. 5 is a block diagram illustrating one example of an intervention module.

FIG. 5 is a block diagram illustrating one example of an intervention module 206-*a*. The intervention module 206-*a* may be one example of the intervention module 206 illustrated in FIG. 2. In some embodiments, the intervention module 206-*a* may perform an intervention to protect against the release of sensitive information. In some cases, the information protection module 104 may trigger one or more interventions (from the intervention module 206-*a*) based on the type of sensitive information that is being released, user preferences, and the severity of the threat of information disclosure. In some configurations, the intervention module 206-*a* may include a muting module 502, a delay module 504, and an alerting module 506.

In one embodiment, the muting module 502 may mute the audio content stream that is being communicated to the other device 102. In another embodiment, the muting module 502 may mute the microphone of the device 102 so that the device 102 will not be able to capture the sensitive information. In some configurations, the duration of the muting may be strategically timed to avoid the release of the entire string of sensitive information. For example, in the case of a credit card number, the intervention module 206-*a* may be triggered after a portion of the credit card number has already been communicated to the other device. In this example, the muting module 502 may mute enough of the numbers to prevent to prevent the other user from being able to easily guess the missing information. In another example, the muting module 502 may perform a sequence of mutes (e.g., one second muted, half a second un-muted) to garble any information that is being received by the other user while maintaining the call connection.

In one embodiment, the delay module 504 may delay the transmission of the audio communication for a specified time. For example, the delay module 504 may delay the remainder of the disclosed sensitive information until the user acknowledges that the sensitive information should be communicated to the other user. In another example, the delay module 502 may delay the communication of the sensitive information so that the user, upon realizing that they have just shared their sensitive information, may terminate the communication of the sensitive information before some or all of the sensitive information has been communicated to the other user.

In one embodiment, the alerting module 506 may alert the user to protect against the release of sensitive information. For example, the alerting module 506 may provide visual alerts, audio alerts, haptic (e.g., vibration) alerts, etc. (when the call monitoring module 202 and/or the audio monitoring module 204 is triggered, for example). In some cases, the visual alert, audio alert, and/or haptic alert may be an intervening indication to a user of a potential release of sensitive information.

In one example, a visual alert (a banner or message displayed on the screen of a device, for example) may include some or all of the information obtained by the call monitoring module 202. In some cases, the visual alert may be accompanied by an audio alert (e.g., beep, chime, etc.) or a haptic alert that indicates a potential release of sensitive information and/or alerts a user of a displayed message. In another example, an audio warning may be an audible voice that says some or all of the information obtained by the call monitoring module 202 and/or the audio monitoring module 204. It is noted that the alerting module 506 may alert the user of a potential release of sensitive information so that the user may make an informed decision about whether the user should trust the other user (e.g., other caller).

Figure 6:
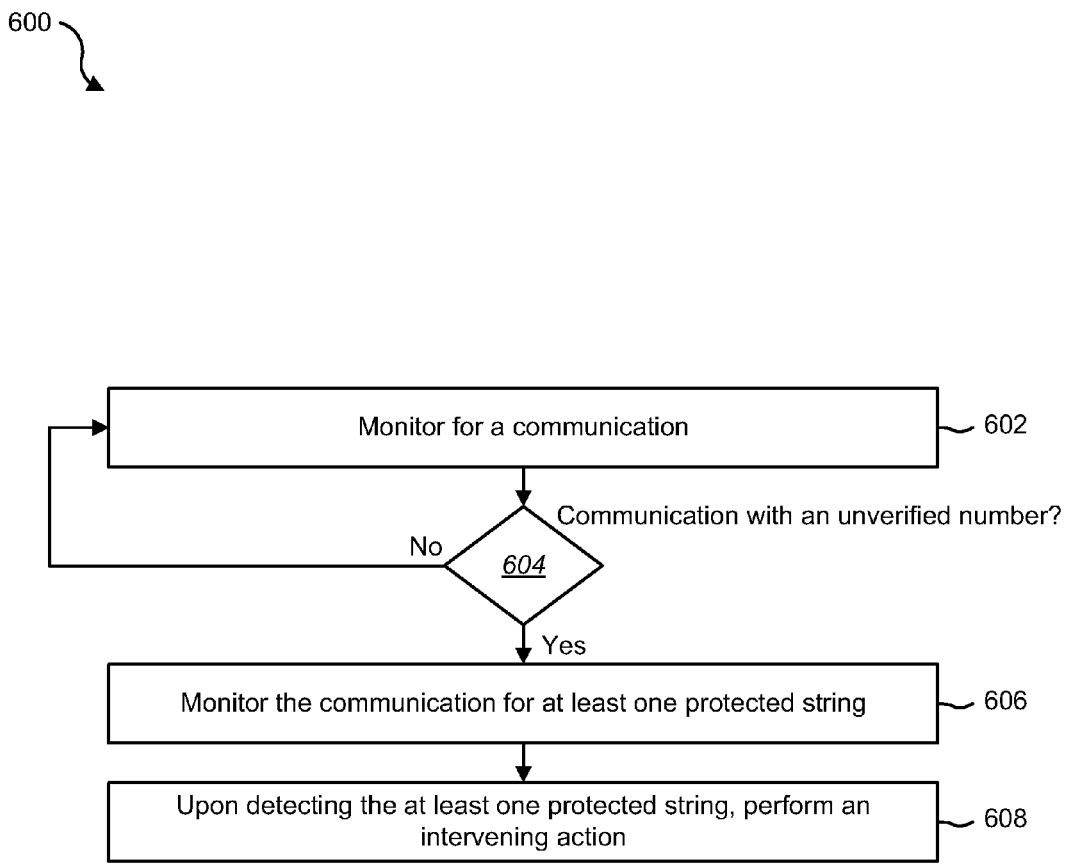
FIG. 6 is a flow diagram illustrating one embodiment of a method to protect against the release of sensitive information.

FIG. 6 is a flow diagram illustrating one embodiment of a method 600 to protect against the release of sensitive information. In some configurations, the method 600 may be implemented by the information protection module 104 illustrated in FIG. 1 or 2.

At step 602, a device may be monitored for a communication. For example, the device may be monitored for a communication between the device and at least one other device (e.g., a call). At step 604, a determination may be made as to whether the communication is with an unverified number. For example, a determination may be made as to whether the call is with an unknown number (e.g., not in white list 304). If the communication is with a verified number, then the method 600 returns to step 602 (e.g., monitoring for a communication). If the communication is with an unverified number, then the method 600 continues to step 606. At step 606, the communication may be monitored for at least one protected string. For example, the communication may be monitored for a string of consecutive numbers (corresponding to a credit card number, for example). At step 608, upon detecting the at least one protected string, an intervening action may be performed. For example, the intervening action may include muting the microphone, outputting an audible warning to the user, and providing visual information about the communication on the device's display.

Figure 7:
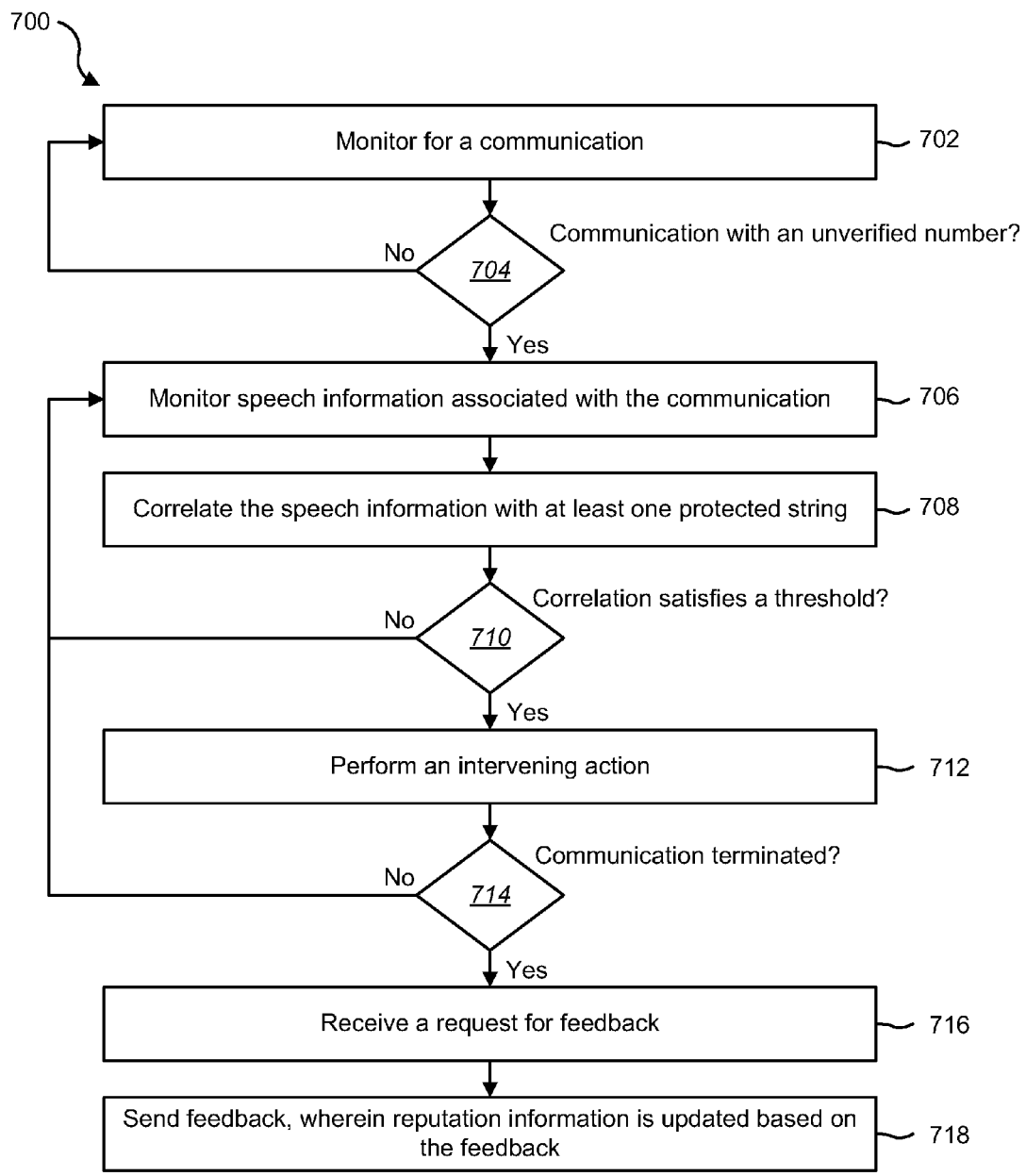
FIG. 7 is a flow diagram illustrating another embodiment of a method to protect against the release of sensitive information.

FIG. 7 is a flow diagram illustrating another embodiment of a method 700 to protect against the release of sensitive information. In some configurations, the method 700 may be implemented by the information protection module 104 illustrated in FIG. 1 or 2.

At step 702, a device may be monitored for a communication. At step 704, a determination may be made as to whether the communication is with an unverified number. If the communication is with a verified number, then the method 700 returns to step 702 (e.g., monitoring for a communication). If the communication is with an unverified number, then the method 700 continues at step 706. At step 706, speech information associated with the communication may be monitored. For example, speech information may be recognized (using voice recognition techniques, for example) to determine the underlying numbers and characters.

At step 708, the speech information may be correlated with at least one protected string. For example, the protected string may correspond to a protected string format (e.g., four consecutive numbers) and/or may correspond to a stored string (salted hash version of the string, for example) (e.g., for a password). In some cases, correlating the speech information with at least one protected string includes correlating each character of the speech information with each character of the protected string.

At step 710, a determination may be made as to whether the correlation satisfies a threshold. If the correlation does not satisfy a threshold (e.g., the speech information is too different from the at least one protected string), then the method 700 returns to step 706 (e.g., monitoring speech information associated with the communication). If the correlation does satisfy a threshold (e.g., the beginning of the speech information correlates with the beginning of the protected information sufficiently to satisfy the threshold), then the method 700 continues at step 712.

At step 712, an intervening action may be performed. At step 714, a determination may be made as to whether the communication has been terminated. If the communication has not been terminated, then the method 700 returns to step 706 (e.g., monitoring speech information associated with the communication). If the communication has been terminated, then the method 700 continues to step 716. At step 716, a request for feedback may be received. For example, the request for feedback may be received from a server (e.g., server 110). In one example, the feedback may be used to create and/or update a database of reputation information. At step 718, feedback may be sent. In some cases, reputation information may be updated based on the feedback. For example, a user may evaluate their experience with a communication and provide feedback so that users (including other users) may discriminate communications based on generated reputation information.

Figure 8:
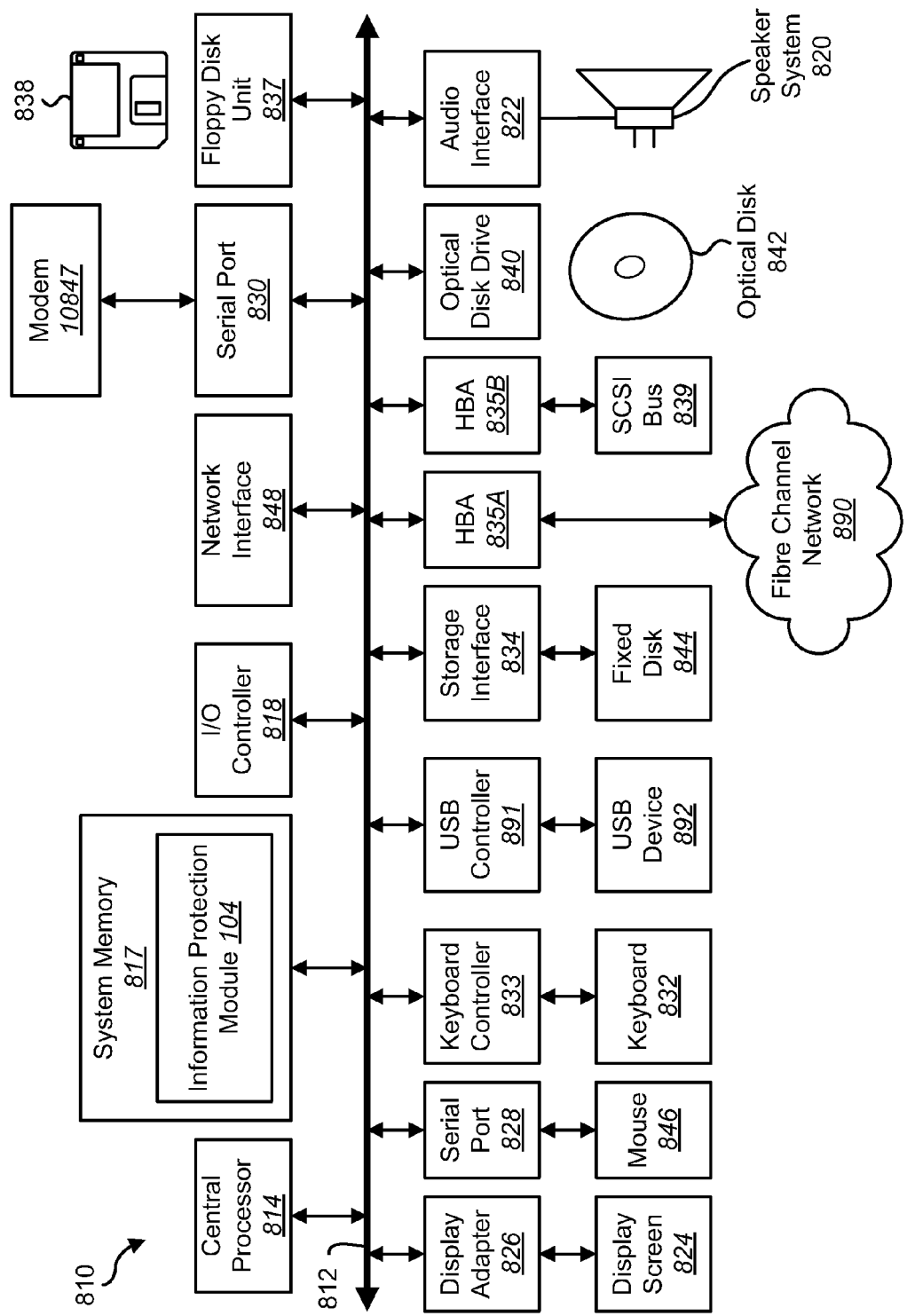
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 891), a storage interface 834, a floppy disk unit 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the information protection module 104 to implement the present systems and methods may be stored within the system memory 817. Applications resident with computer system 810 are generally stored on and accessed via a non-transitory computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in a non-transitory computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
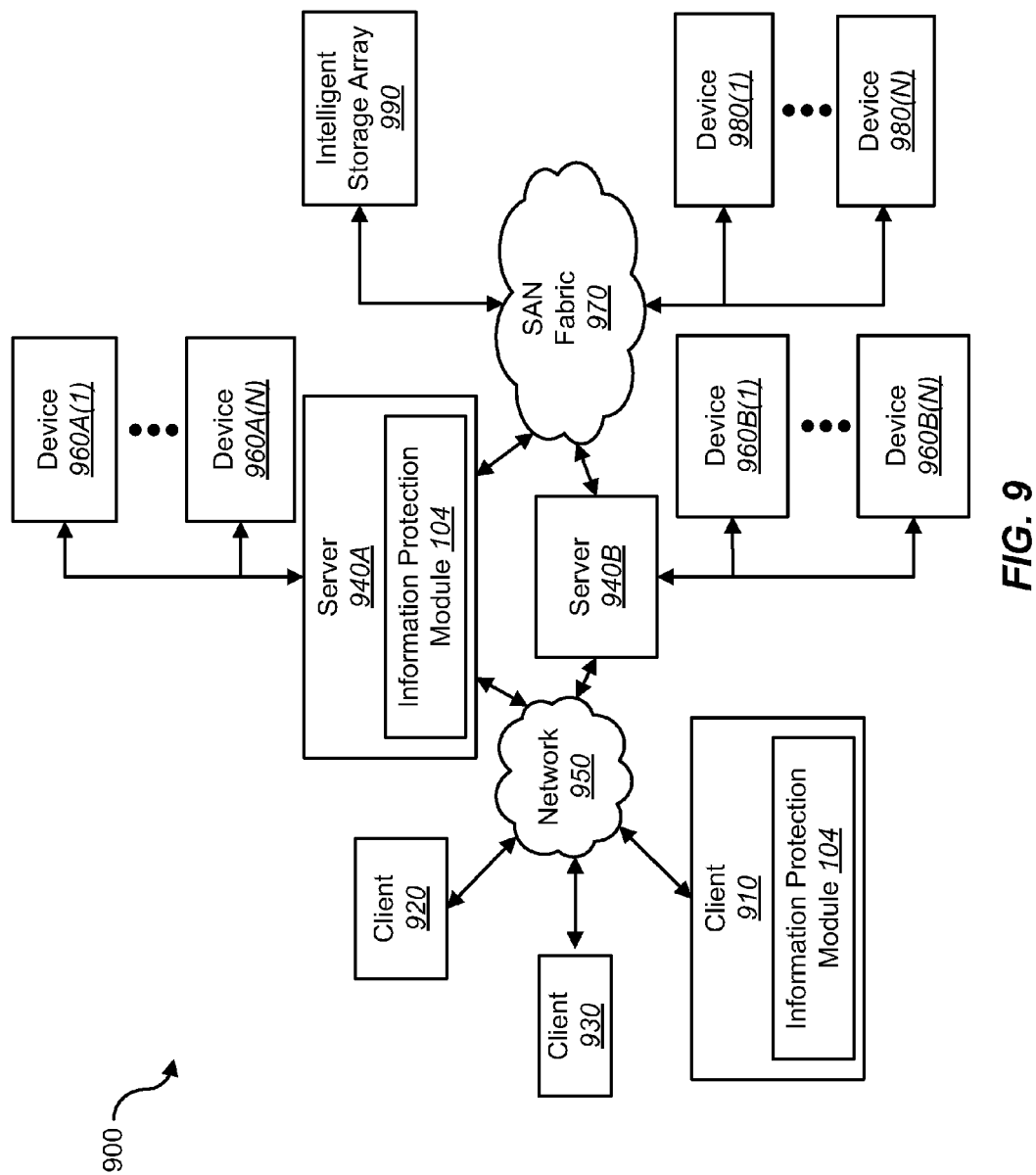
FIG. 9 is a block diagram depicting a network architecture in which client systems, as well as storage servers (any of which can be implemented using a computer system), are coupled to a network.

FIG. 9 is a block diagram depicting a network architecture 900 in which client systems 910, 920 and 930, as well as storage servers 940A, 940B (any of which can be implemented using computer system 810), are coupled to a network 950. In one embodiment, the information protection module 104 may be located within the storage servers 940A, 940B and/or the client systems 910, 920, 930 to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A, 940B, and so by client systems 910, 920 and 930 via network 950. Intelligent storage array 990 is also shown as an example of a specific storage device accessible via SAN fabric 970.

With reference to computer system 810, modem 847, network interface 848, or some other method can be used to provide connectivity from each of client computer systems 910, 920, and 930 to network 950. Client systems 910, 920, and 930 are able to access information on storage server 940A or 940B using, for example, a web browser, or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to protect against the release of information, comprising:
   monitoring, by a processor of a telephone device of a user, an established communication with an unverified number, the established communication comprising a connected telephone call between the telephone device of the user and a device associated with the unverified number;
   monitoring, by the processor, audible information from the established communication for a spoken release of at least a portion of a protected string in during the established communication; and
   upon detection of at least a portion of the protected string from the audible information, performing, by the processor, an intervention action, the intervention action preventing the user from providing sensitive information during the established communication.

2. The method of claim 1, further comprising:
   determining at least one characteristic about the unverified number.

3. The method of claim 1, wherein monitoring the audible information comprises:
   obtaining a digital version of the audible information;
   correlating the digital version with the protected string; and
   determining that the correlation satisfies a threshold.

4. The method of claim 1, wherein the protected string comprises a sequence of numbers having at least two numbers.

5. The method of claim 1, wherein the protected string comprises a sequence of letters having at least two letters.

6. The method of claim 1, wherein the protected string comprises a sequence of characters having a combination of letters and numbers.

7. The method of claim 1, further comprising:
   obtaining reputation information about the unverified number.

8. The method of claim 1, further comprising:
   providing reputation information about the unverified number.

9. A computing device configured to protect against the release of information, comprising:
   a processor;
   memory in electronic communication with the processor;
   instructions stored in the memory, the instructions being executable by the processor to:
      monitor an established communication with an unverified number, the established communication comprising a connected telephone call between the telephone device of the user and a device associated with the unverified number;
      monitor audible information from the established communication for a spoken release of at least a portion of a protected string during the established communication; and
      upon detection of at least a portion of the protected string from the audible information, perform an intervention action, the intervention action preventing the user from providing sensitive information during the established communication.

10. The computing device of claim 9, wherein the instructions are further executable by the processor to:
   determine at least one characteristic about the unverified number.

11. The computing device of claim 9, wherein the instructions to monitor the audible information are further executable by the processor to:
   obtain a digital version of the audible information;
   correlate the digital version with the protected string; and
   determine that the correlation satisfies a threshold.

12. The computing device of claim 9, wherein the protected string comprises a sequence of numbers having at least two numbers.

13. The computing device of claim 9, wherein the protected string comprises a sequence of letters having at least two letters.

14. The computing device of claim 9, wherein the protected string comprises a sequence of characters having a combination of letters and numbers.

15. The computing device of claim 9, wherein the instructions are further executable by the processor to:

obtain reputation information about the unverified number.

16. The computing device of claim 9, wherein the instructions are further executable by the processor to:

provide reputation information about the unverified number.

17. A computer-program product to protect against the release of information, the computer-program product comprising a non-transitory computer-readable storage medium that stores computer executable instructions, the instructions being executable by a processor to:

monitor an established communication with an unverified number, the established communication comprising a connected telephone call between the telephone device of the user and a device associated with the unverified number;

monitor audible information from the established communication for a spoken release of at least a portion of a protected string during the established communication; and upon detection of at least a portion of the protected string from the audible information, perform an intervention action, the intervention action preventing the user from providing sensitive information during the established communication.

18. The computer-program product of claim 17, wherein the instructions are further executable by the processor to:

determine at least one characteristic about the unverified number.

* * * * *